United States Patent [19]

Onodera et al.

[11] Patent Number: 4,715,690
[45] Date of Patent: Dec. 29, 1987

[54] PHOTOGRAPHIC SCREEN

[75] Inventors: Kaoru Onodera; Satoru Hohnishi; Kazuyuki Kobayashi; Kazuo Shiozawa, all of Hino, Japan

[73] Assignee: Konishiroku Photo Ind. Co., Ltd., Tokyo, Japan

[21] Appl. No.: 948,430

[22] Filed: Dec. 31, 1986

Related U.S. Application Data

[63] Continuation of Ser. No. 836,223, Feb. 28, 1986, abandoned, which is a continuation of Ser. No. 525,254, Aug. 19, 1983, abandoned, which is a continuation of Ser. No. 234,329, Feb. 13, 1981, abandoned.

[30] Foreign Application Priority Data

Feb. 13, 1980 [JP] Japan .................................. 55-15509

[51] Int. Cl.⁴ .................................................. G02F 1/17
[52] U.S. Cl. ...................................... 350/357; 350/353
[58] Field of Search ................. 350/357, 355, 356, 353

[56] References Cited

U.S. PATENT DOCUMENTS 3,986,771 10/1976 Tsukada .............................. 350/357
4,297,695 10/1981 Marshall ............................. 350/357

Primary Examiner—James W. Davie
Attorney, Agent, or Firm—Frishauf, Holtz, Goodman & Woodward

[57] ABSTRACT

There is presented an optical screen suitable for taking a picture by placing it between the object and a photosensitive material. The optical screen has a specific means for controlling the difference in transmission density in an optically heterogeneous pattern and/or the specific area of the lower transmission density portions, typically an electrochromic display device. By use of such a single optical screen having a variable optically heterogeneous pattern, cumbersome operations for displacing one screen for another in the prior art can be obviated.

15 Claims, 7 Drawing Figures

PHOTOGRAPHIC SCREEN

This application is a continuation of prior application Ser. No. 836,223 filed Feb. 28, 1986, now abandoned, which in turn is a continuation of Ser. No. 525,254 filed Aug. 19, 1983, now abandoned, which in turn is a continuation of Ser. No. 234,329 filed Feb. 13, 1981, now abandoned.

BACKGROUND OF THE INVENTION

This invention relates to an optical screen especially suitable for photographic purposes which can continuously change the gradation and exposure range in photosensitive materials.

In general, when objects are photographically recorded, there are required photosensitive materials having a gradation suitable for that object and photographing purposes. For example, when an object is photographed by a camera, a better photograph can be obtained only if a photosensitive material having a relatively soft gradation is used for an object of higher maximum/minimum luminous intensity ratio or if a photosensitive material having a relatively hard gradation is used for an object of lower maxmimum/minimum luminous intensity ratio. Photosensitive materials having various different gradations are therefore provided and utilized as required. However, it is extremely disadvantageous for manufacturers to prepare many kinds of photosensitive materials exactly controlled in various gradations.

For users, furthermore, it is cumbersome and in fact difficult to select optimum photosensitive material for an object and photographing purposes.

Similar problems are found in the so-called printing operation (process) in which photographic papers are printed. In the normal printing operation, negative or positive image is respectively reproduced into positive photographs or duplicates. In order to obtain an ideal print, there is required an ideal combination of an original negative with a photographic paper in gradation. Accordingly, photographic papers and original photographic films such as negative films are produced under severe quality control which is in fact insufficient. Moreover, photographic films and papers which are commercially available are produced by a plurality of manufacturers which are different in design idea and the like. Therefore, it is extremely difficult to obtain constantly an ideal combination of film with photographic paper.

Recently, instant photographic films are being broadly used, so that duplication from the instant photographic films is increasingly required. For this purpose, photographic papers for positive are normally used which are of the same type as one for transparent positive (slide). For better operative efficiency, the same type of photographic paper has been normally used for different operations. However, if a photographic paper designed for slides is used to obtain duplicates from the instant photographic films, prints having very soft tone would be obtained. If a photographic paper suitable for the instant photographic film is used to reproduce prints from slides, the prints will have extremely hard tone. No single photographic paper has been realized in spite of the efforts of many manufacturers.

Furthermore, it is required that a line image such as letters is recorded in one area of a printed photograph. Such a printed photograph includes driving license cards and ID cards in which a photograph of owner's face and letters are simultaneously printed in. It is generally desirable to use photographic papers having relatively hard tone for lined images and to utilize photographic papers having relatively soft tone for face photograph. It is preferred that a photosensitive material is simultaneously provided with harder and softer tone portions. However, no such photosensitive material has been provided from any manufacturer.

Therefore, there is strongly desired a method for regulating the gradation in a photosensitive material from outside to overcome the above problems. In response to this, methods for optically changing the gradation by the use of a photographic screen has been proposed in the "RESEARCH DISCLOSURE" Vols. 175 and 182 respectively issued on Nov., 1978 and June, 1979, at the respective items 17533 and 18276. In these proposed methods, there is used a photographic screen which comprises a light-transmitting (lower transmission density) portion of straight-line, checkerboard or dot pattern and a non-transmitting (higher transmission density) portion. The above "RESEARCH DISCLOSURE" describes that a desired gradation in a color print can be achieved by arranging said screen in front of the exposed side of the color print and exposing the color print through the screen and yet that the gradation in the color print can be changed by using another screen different in the density difference, area ratio, shape or spectral transmission factor difference between the light-transmitting and non-transmitting portions.

In such a manner, photographic images having various different gradations can be obtained by the use of only a single type of photosensitive material. However, a great many types of screens must be provided for the optimum gradation in a photosensitive material. In addition to this, it is cumbersome to choose a screen optimum for an object and photographing purposes from many screens and then exchange that screen for the previous screen in each photographing operation.

It is an object of this invention to provide an optical screen free from such a problem, that is, which can regulate the gradation in photosensitive materials.

Another object of the present invention is to provide a photographic process using such an optical screen.

SUMMARY OF THE INVENTION

According to the present invention, there is provided an optical screen, comprising an optically heterogeneous pattern consisting of relatively higher and lower transmission density portions for the light, said pattern being variable, particularly in its transmission density or specific area.

In practicing the present invention, there is provided a means for obtaining a variable optically heterogeneous pattern in an optical screen. Such a means can be provided by use of an electrochromic film, a liquid crystal film, polarizing sheet, resilient sheet or slant plate. Among them, an electrochromic film can most preferably be utilized in this invention.

Thus, according to a preferred embodiment of the present invention, said means comprises an electrochromic display device provided on a transparent substrate, said device having an electrochromic film sandwiched between two transparent electrode layers, each layer having a number of electrodes and forming variable selected pairs of counter-electrodes whereat higher transmission density portions are to be formed and controlled to be varied in density by passage of current.

BRIEF DESCRIPTION OF THE DRAWINGS

The above preferred embodiment of the present invention will now be described in detail with reference to the drawings, in which.

DESCRIPTION OF THE PREFERRED EMBODIMENTS

Figure 1:
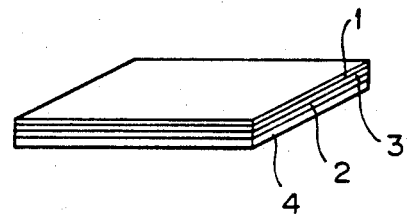
FIG. 1 is a perspective view of a photographic screen which is a preferred embodiment of this invention.
Figure 2:
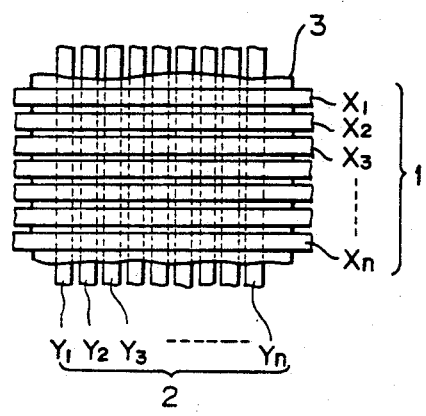
FIG. 2 is an enlarged view illustrating part of the electrode film.

In FIG. 1, the photographic film includes electrode layers 1 and 2, an electrochromic film 3 interposed between the electrode layers 1 and 2, and a base plate 4 of glass or the like. FIG. 2 shows a portion of the screen on an enlarged scale. As can be seen from FIG. 2, the electrode layers 1 and 2 include strip-like electrodes $X_1-X_n$ and $Y_1-Y_n$ formed in the respective layers which intersect each other at right angle with the electrochromic film 3 interposed therebetween. The electrochromic film 3 is adapted to change its transmission factor in response to a voltage which is applied thereto in the same manner as has been utilized in displaying devices as an electrochromic display (ECD). The electrode layers 1, 2 and base plate 4 are made of transparent materials.

Figure 3:
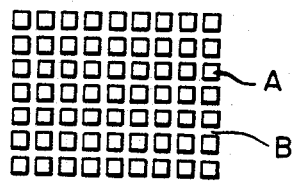
FIGS. 3 and 4 illustrate patterns which can be produced due to the difference in transmission density.

When a voltage from an external power source is applied between the electrodes ($X_1-X_n$, $Y_1-Y_n$) in such a screen, the portions of the electrodes ($X_1-X_n$, $Y_1-Y_n$) which overlap each other vary in transmission factor to produce a pattern based on the difference in transmission density. FIG. 3 shows such a pattern which includes the overlapped portions A and the other portions B in the electrodes. The overlapped portions A are relatively high in the transmission density (hereinafter called high density portions) while the portions B are relatively low in the transmission density (hereinafter called low density portions). The transmission density in the portions B is in such a value as shows its transparent or substantially transparent state at all times independently of voltages which is applied to the electrodes. On the other hand, the transmission density in the overlapped portions vary in response to the applied voltages. By combining such a screen body with a variable voltage source, therefore, one can provide a photographic screen which can freely change the difference in transmission density between the high and low density portions for obtaining optimum gradation in any photosensitive material.

Figure 4:
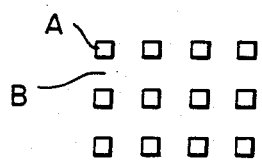

According to this invention, furthermore, the specific area in the low density portion of said screen body, that is, the percentage of the low density portions based on the total area of screen can be changed. This can be achieved by selecting various combinations of the electrodes $X_1-X_n$ with the other electrodes $Y_1-Y_n$ to obtain the overlapped portions A at various different locations. FIG. 4 shows a pattern obtained when a voltage is applied to one of such combinations, for example, of the electrodes $X_3$, $X_6$, $X_9$ ... with the other electrodes $Y_3$, $Y_6$, $Y_9$ ... Thus, the specific area in the low density portion can be changed in a substantially continuous fashion so that the photosensitive material will be regulated into optimum gradation. In addition to this, the transmission density difference can simultaneously be changed. In such a viewpoint that the light quantity is prevented from being lost unnecessarily, the transmission density in the low density portion is preferably as low as possible. The density difference between the low and high density portions may be in a distinguishable level or more. Depending on the type and others of the photosensitive material, the density difference may be variable preferably within the range of between 0.1 and 3.0.

The optically uneven pattern, which includes the low and high density portions together, may be of a fine-line, checkerboard or dot pattern whether it is regularly arranged or not. Upon manufacturing, various different patterns can be produced by varying the shape and arrangement of the electrode. From the viewpoint of manufacturing and using the screen, however, regular checkerboard or dot pattern is preferred. Pitch repeated in this pattern is determined depending upon the application of the photosensitive material used, the precision required on using the screen and the requirements in manufacturing. It is desirable that the pitch is at least in such an extent that one cannot feel any roughness in photographed images. It is generally said that one can distinguish one particle from others through the least distance of distinct vision (25 cm) without any auxiliary means if the particle size is 76 μm or more. The size of distinguishable particle becomes larger as the distance of observation increases. This observation distance is determined depending upon the size of picture plane. In view of these factors, the screen must have a pattern repetition of $200 \times S^{-\frac{1}{2}}$/mm where S is the size of a picture plane on the photosensitive material measured in square millimeters. The pattern repetition is preferably $400 \times S^{-\frac{1}{2}}$/mm or more.

The specific area in the low density portion may be varied in the range of 10%-90%. The density difference and specific area are not necessarily changed uniformly throughout the screen. The screen may have the light-blocking property against only a portion of the wavelength zone in the photographic light, but preferably against the overall wavelength. Moreover, there may be an indefinite boundary between the high and low density portions. In other words, the high density portion can continuously be merged into the lwo density portion if any distinguishable variation can be obtained with respect to the density difference and/or the specific area.

Although this invention has been described with reference to the preferred embodiment which utilizes the characteristic of electrochromic film, liquid crystal film can be also used in this invention to establish the desired relation between the applied voltage and the transmission factor as in the electrochromic film.

Some other embodiments of the present photographic screen will now be described hereinbelow.

Figure 5:
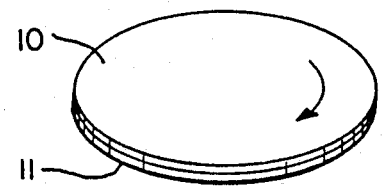
FIGS. 5-7 illustrate other embodiments.

First of all, an embodiment utilizing the polarization will now be decribed with reference to FIG. 5. This embodiment includes a screen comprising a sheet 10 for polarizing the photographic light uniformly and a part-polarizing sheet 11 having a polarizable section and a non-polarizable section. One of the sheets (i.e., sheet 10) is adapted to be rotated around the optical axis. In such a manner, the difference in transmission density can freely be changed to regulate the gradation of the photosensitive material.

Figure 6:
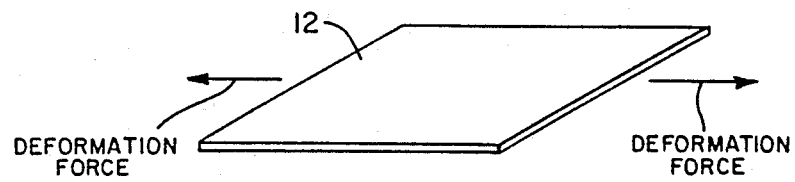

In another embodiment, shown in FIG. 6, a screen may be made of a resilient sheet of rubber 12 which can be deformed from outside. For example, the screen comprises a rubber sheet having relatively low transmission density and a pattern of relatively high transmission density which is printed on the rubber sheet. Alternatively, the screen may comprise a semitransparent sheet of rubber which includes a plurality of openings formed therethrough. The rubber sheet may be deformed under a simple tension (shown in FIG. 6) or compression, or under shear. In the former, the sheet is deformed to reduce the transmission density in the high density portion so that the difference of density will be varied. In the latter, the density difference and the specific area in the low density portion will be changed if the sheet is thicker with the upper and lower faces thereof defining the high density portion. In any event, the density difference and specific area can continuously be varied. Thus, the gradation can freely be regulated.

Figure 7:
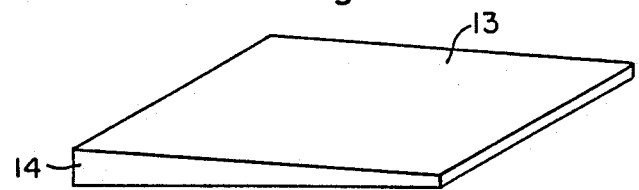

Finally, still another embodiment of this invention may, shown in FIG. 7, includes a slant plate 13 which consists of a transparent plate with the thicker section 14 thereof being provided with an increased transmission density. The transparent plate is adapted to be displaced from outside so that the inclination thereof will be changed. When the inclination of the transparent plate is changed, the photographic light is also changed in incident angle so that the area in the high density portion and the density difference will be substantially varied to adjust the gradation of the photographic material in an optional fashion. This embodiment is suitable for a screen of relatively large size. In this embodiment, furthermore, two sheets having high density portions may similarly be used to locate close to each other instead of the transparent plate.

As can be seen from the foregoing, this invention provides a single optical screen especially suitable for photographic purpose having all of the desired photographic properties. Therefore, this invention can eliminate any cumbersome operation for displacing one screen for another as in the prior art. Furthermore, this invention does not need any screen-mounting mechanism so that the overall device can be simplified contributing to reduced manufacturing cost.

We claim:

1. A light transmitting electrochromic optical screen for photographic use, said screen being arranged to pass light prior to the light exposing a photosensitive material, comprising:
an optically heterogenerous pattern consisting of regions of relatively higher light transmission density and regions of relatively lower light transmission density, and
means for variably defining predetermined areas on said screen as said regions of higher and lower light transmission density by varying at least one of:
(i) the area of both said higher and lower light transmission density regions, and
(ii) the transmission density of said region of relatively higher light transmission density,
to thereby vary the pattern of said relatively higher and lower light transmission density regions of said screen and thereby varying the light transmission characteristics of said screen.

2. The screen according to claim 1, wherein the screen has a repeating pattern, the number of units of the repeating pattern being at least $200 \times S^{-1}$/mm, wherein S is the size of a picture plane of the photosensitive material measured in square millimeters.

3. The screen according to claim 1, wherein said screen further comprises a sheet for uniformly polarizing photographic light and a sheet having a polarized section and non-polarized section, one of said sheets being arranged to rotate around the optical axis.

4. The screen according to claim 1, wherein the screen is a rubber sheet.

5. The screen according to claim 1, wherein the screen further comprises a transparent plate having a thickened region of relatively higher transmission density.

6. A light transmitting optical screen for photographic use, said screen being arranged to pass light prior to the light exposing a photosensitive material, comprising:
an optically heterogenerous pattern consisting of regions of relatively higher light transmission density and regions of relatively lower light transmission density, and
means for variably defining predetermined areas on said screen as said regions of higher and lower light transmission density by varying at least one of:
(i) the area of both said higher and lower light transmission density regions, and
(ii) the transmission density of said region of relatively higher light transmission density,
to thereby vary the pattern of said relatively higher and lower light transmission density regions of said screen and thereby varying the light transmission characteristics of said screen;
wherein said screen comprises an electrochromic display device provided on a transparent substrate, said display device having an electrochromic film sandwiched between two transparent electrode containing layers, said two electrode containing layers including a plurality of electrodes arranged to form a plurality of overlapping regions where electrodes of each layer overlap, and non-overlapping regions, said overlapping regions having a higher transmission density than said non-overlapping regions, the transmission density of said overlapping regions being variable as a result of the passage of electric current through said electrodes.

7. The screen according to claim 6, wherein the difference in transmission density between said overlapping and non-overlapping regions is variable within the range from 0.1 to 3.0.

8. The screen according to claim 6 or claim 7, wherein the area of the non-overlapping region is variable within the range from 10 to 90%.

9. The screen according to claim 6, wherein the electrodes are arranged regularly in the form of a checker or dot pattern.

10. An optical screen for use in exposing a photosensitive material to light, comprising an electrochromic display device provided on a transparent substrate, said display device having an electrochromic film sandwiched between two transparent electrode containing layers, said two electrode containing layers including a plurality of electrodes arranged to form a plurality of overlapping regions where electrodes of each layer overlap, and non-overlapping regions, said overlapping regions having a higher transmission density that said nonoverlapping regions, the transmission density of said overlapping regions being variable as a result of the passage of electric current through said electrodes, and wherein the screen has a repeating pattern, the number of units of the repeating pattern being at least $200 \times S^{-\frac{1}{2}}/mm$, wherein S is the size of a picture plane of the photosensitive material measured in square millimeters.

11. A method of transmitting light corresponding to an image onto a photosensitive material comprising:
allowing light to contact said photosensitive material through a light transmitting electrochromic optical screen to thereby expose said photosensitive material to said light after said light passes through said screen, said optical screen comprising an optically heterogenerous pattern consisting of regions of relatively higher light transmission density and regions of relatively lower light transmission density, and varying at least one of:
   (i) the area of both said higher and lower light transmission density regions, and
   (ii) the transmission density of said region of relatively higher light transmission density,
to thereby vary the pattern of said relatively higher and lower light transmission density regions of said screen and to thereby vary the light transmission characteristic of said screen.

12. A method of transmitting light corresponding to an image onto a photosensitive material comprising:
allowing light to contact said photosensitive material through a light transmitting optical screen to thereby expose said photosensitive material to said light after said light passes through said screen, said optical screen comprising an optically heterogenerous pattern consisting of regions of relatively higher light transmission density and regions of relatively lower light transmission density, and varying at least one of:
   (i) the area of both said higher and lower light transmission density regions, and
   (ii) the transmission density of said region of relatively higher light transmission density,
to thereby vary the pattern of said relatively higher and lower light transmission density regions of said screen and to thereby vary the light transmission characteristic of said screen;
wherein said screen comprises an electrochromic display device provided on a transparent substrate, said device having an electrochromic film sandwiched between two transparent electrode containing layers, said electrodes arranged to form a plurality of overlapping regions and non-overlapping regions, said overlapping regions having a higher transmission density than said non-overlapping regions, the transmission density of said overlapping regions being variable as a result of the passage of electric current through said electrodes.

13. The method according to claim 12, wherein the screen has a repeating pattern, the number of units of the repeating pattern being at least $200 \times S^{-\frac{1}{2}}/mm$, wherein S is the size of a picture plane on the photosensitive material measured in square millimeters.

14. A method of transmitting light corresponding to an image onto a photosensitive material comprising:
allowing light to contact said photosensitive material through a light transmitting optical screen to thereby expose said photosensitive material to said light after said light passes through said screen, said optical screen comprising an optically heterogenerous pattern consisting of regions of relatively higher light transmission density and regions of relatively lower light transmission density, and varying at least one of:
   (i) the area of both said higher and lower light transmission density regions, and
   (ii) the transmission density of said region of relatively higher light transmission density,
to thereby vary the pattern of said relatively higher and lower light transmission density regions of said screen and to thereby vary the light transmission characteristic of said screen;
wherein said screen comprises an electrochromic display device provided on a transparent substrate, said display device having an electrochromic film sandwiched between two transparent electrode containing layers, electrodes of said electrode containing layers being arranged to form a plurality of separated overlapping regions where electrodes of said electrode containing layers overlap, said overlapping regins having a higher transmission density than non-overlapping regions, said varying step comprising varying the respective areas of said overlapping and non-overlapping regions by selecting electrodes of said two transparent electrode containing layers having respective dimensions such that the area of overlap of said respective selected electrodes corresponds to the desired area of said overlapping regions of relatively higher transmission density, and applying an electrical signal to said selected electrodes.

15. The method of claim 14, wherein said applied electrical signal is variable.

* * * * *